United States Patent
Cho et al.

(10) Patent No.: US 9,888,512 B2
(45) Date of Patent: Feb. 6, 2018

(54) APPARATUS AND METHOD FOR CONNECTING PACKET DATA NETWORK IN MOBILE COMMUNICATION SYSTEM

(71) Applicant: Samsung Electronics Co., Ltd., Gyeonggi-do (KR)

(72) Inventors: Song Yean Cho, Seoul (KR); Han Na Lim, Seoul (KR); Sang Soo Jeong, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 210 days.

(21) Appl. No.: 14/371,992

(22) PCT Filed: Jan. 11, 2013

(86) PCT No.: PCT/KR2013/000251
§ 371 (c)(1),
(2) Date: Jul. 11, 2014

(87) PCT Pub. No.: WO2013/105817
PCT Pub. Date: Jul. 18, 2013

(65) Prior Publication Data
US 2014/0355590 A1    Dec. 4, 2014

(30) Foreign Application Priority Data

Jan. 11, 2012  (KR) .................. 10-2012-0003535

(51) Int. Cl.
*H04W 76/02* (2009.01)
*H04W 48/20* (2009.01)
*H04W 8/24* (2009.01)

(52) U.S. Cl.
CPC ....... *H04W 76/025* (2013.01); *H04W 76/022* (2013.01); *H04W 8/24* (2013.01); *H04W 48/20* (2013.01)

(58) Field of Classification Search
CPC .................. H04W 76/022; H04W 76/025
See application file for complete search history.

(56) References Cited

U.S. PATENT DOCUMENTS

2011/0213897 A1*  9/2011  Zhao .................. H04W 76/02
                                          709/248

FOREIGN PATENT DOCUMENTS

KR   10-2005-0054663    6/2005
KR   10-2008-0072304    8/2008
(Continued)

OTHER PUBLICATIONS

International Search Report dated Apr. 29, 2013 in connection with International Patent Application No. PCT/KR2013/000251, 5 pages.
(Continued)

*Primary Examiner* — Derrick Ferris
*Assistant Examiner* — Kevin Lee

(57) ABSTRACT

A method for encoding streaming data according to one embodiment of the present invention comprises: a step of dividing a forward error correction (FEC) source block into one or more FEC sub-blocks; a first encoding step of FEC encoding said one or more FEC sub-blocks; a second encoding step of encoding said FEC source block; and a step of generating third encoded data including first encoded data encoded in the first encoding step and second encoded data encoded in the second encoding step. According to one embodiment of the present invention, a streaming service can be smoothly provided to multiple users in various environments or in a communication environment that varies according to movement or changes in a communication state. Further, a plurality of pieces of parity information can be transmitted to provide a streaming service which is capable of high reliability data recovery.

12 Claims, 4 Drawing Sheets

(56) References Cited

FOREIGN PATENT DOCUMENTS

| KR | 10-2009-0008449 | | 1/2009 |
|----|-----------------|---|--------|
| KR | 10-2010-0049625 | | 5/2010 |
| WO | WO 2007/130281 A1 | * | 11/2007 |
| WO | WO 2011/133585 A1 | | 10/2011 |

OTHER PUBLICATIONS

Written Opinion of International Searching Authority dated Apr. 29, 2013 in connection with International Patent Application No. PCT/KR2013/000251, 4 pages.

* cited by examiner

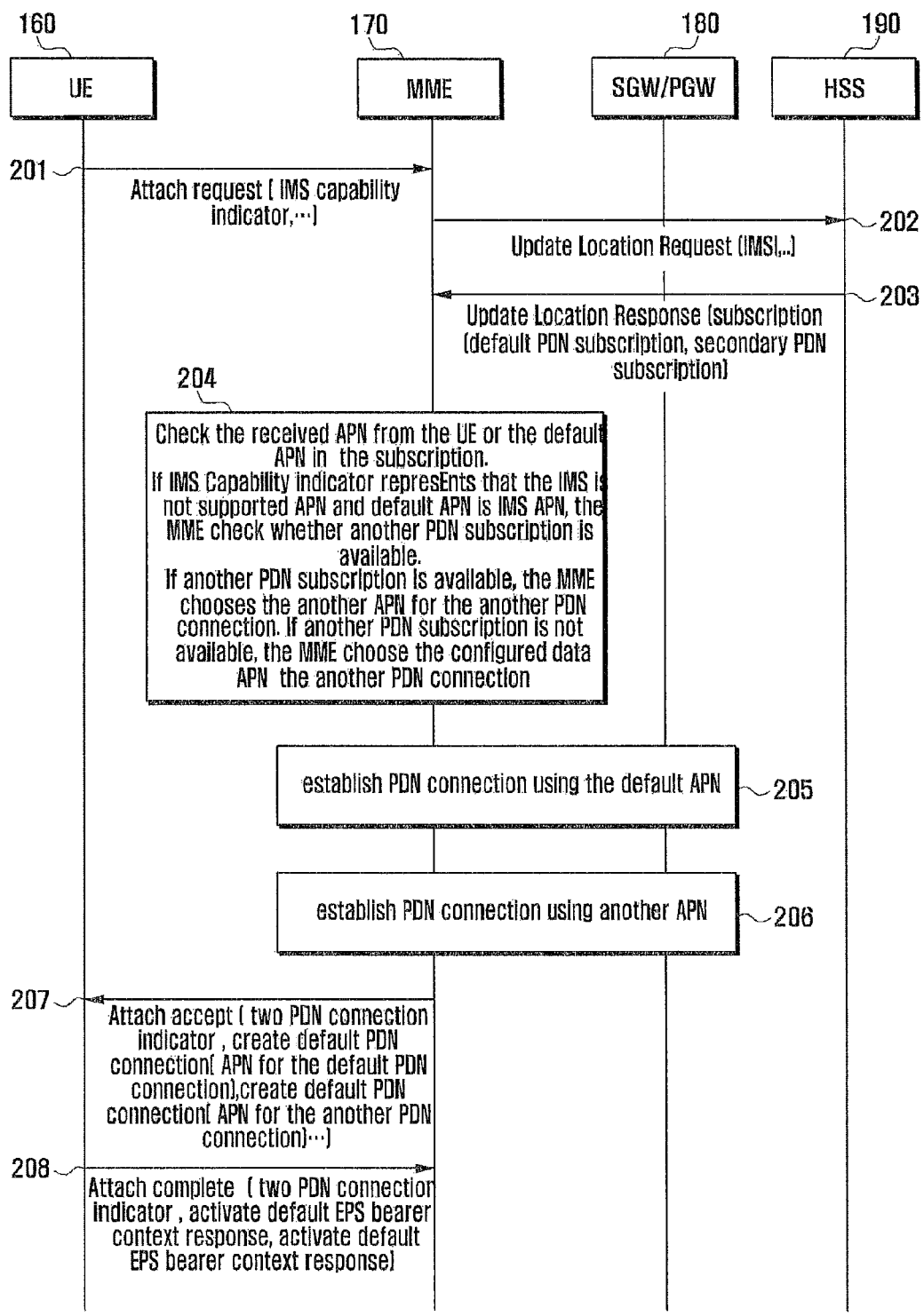

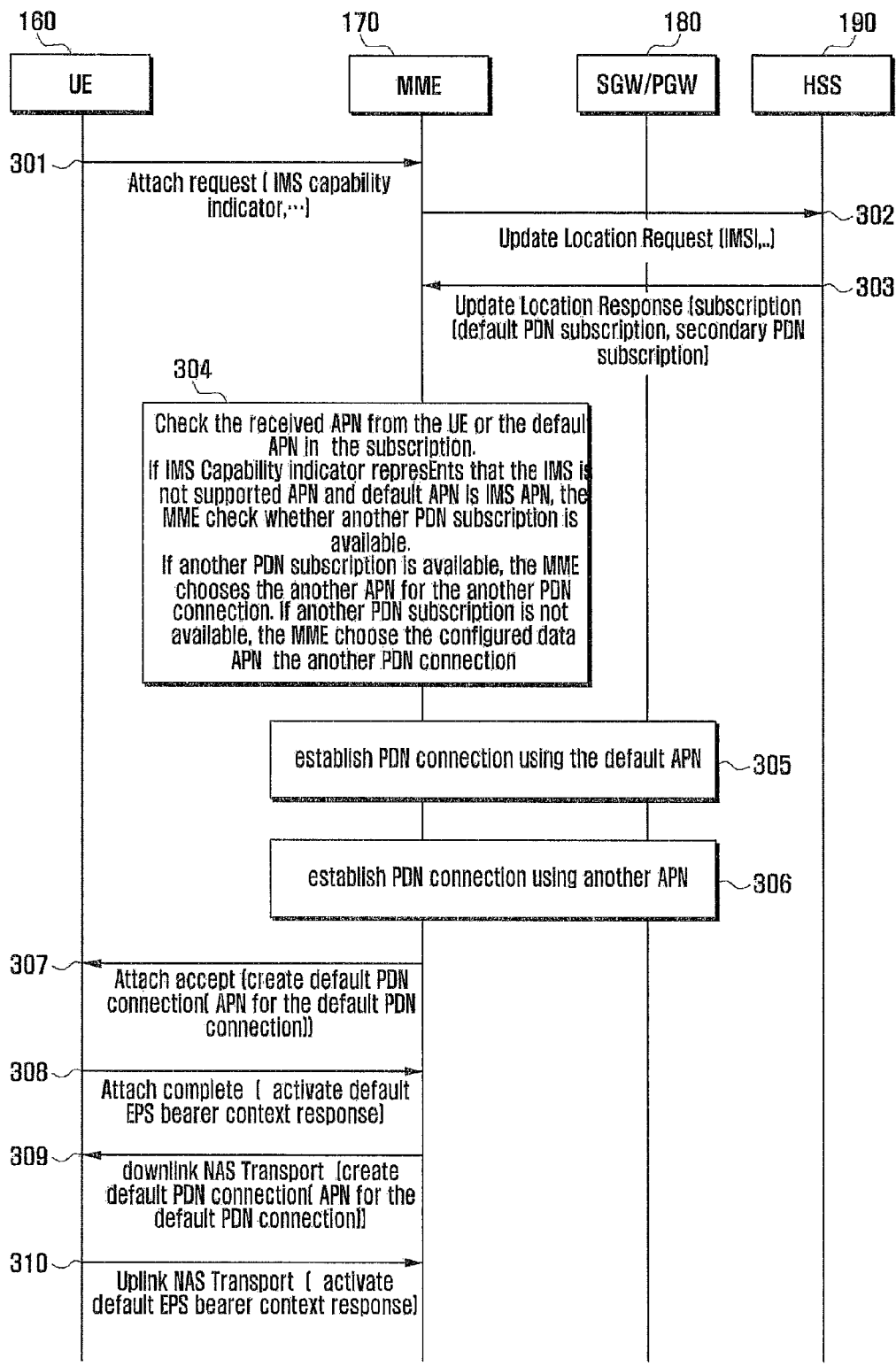

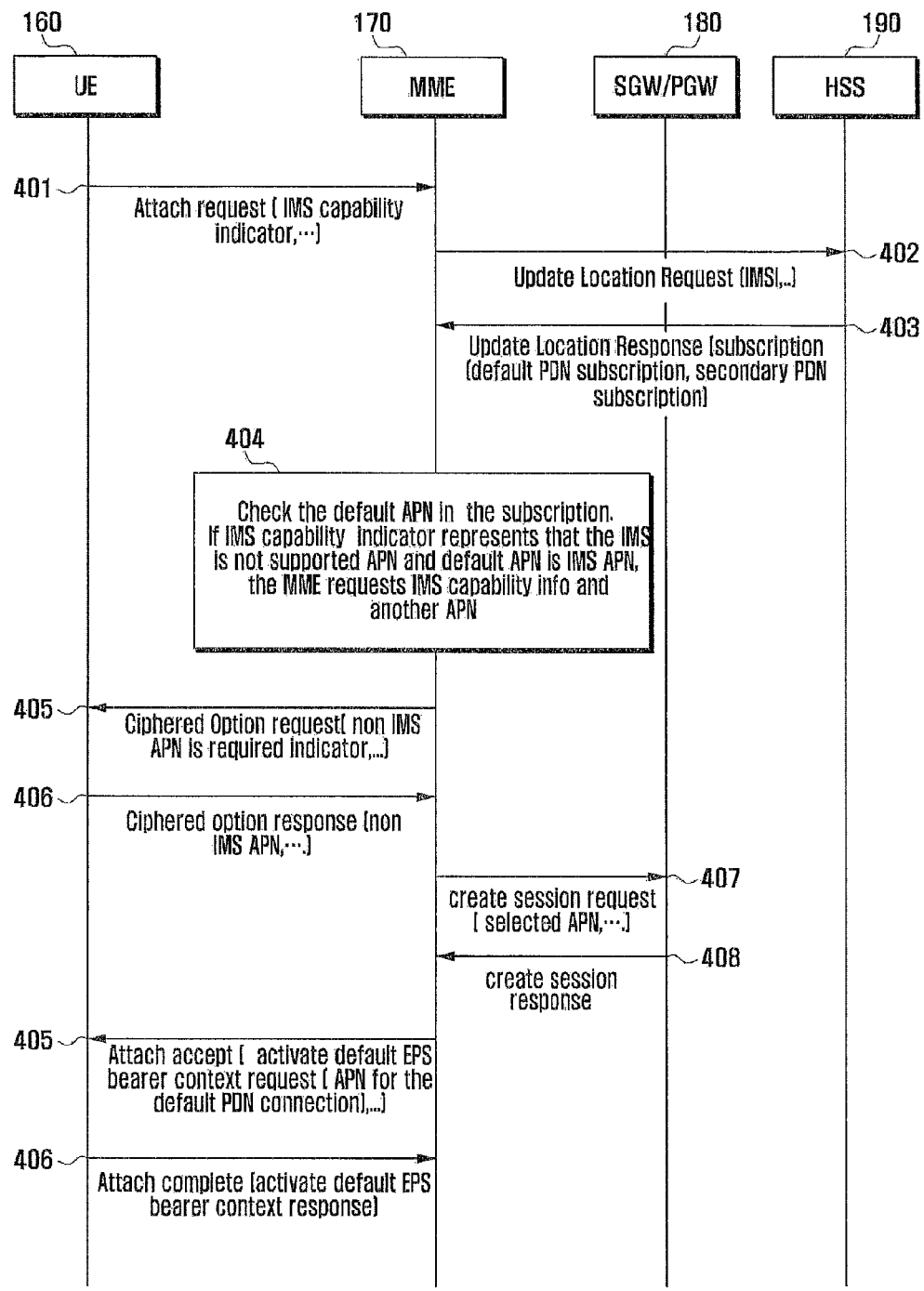

APPARATUS AND METHOD FOR CONNECTING PACKET DATA NETWORK IN MOBILE COMMUNICATION SYSTEM

CROSS-REFERENCE TO RELATED APPLICATION(S)

The present application claims priority under 35 U.S.C. §365 to International Patent Application No. PCT/KR2013/000251 filed Jan. 11, 2013, entitled "APPARATUS AND METHOD FOR CONNECTING PACKET DATA NETWORK IN MOBILE COMMUNICATION SYSTEM". International Patent Application No. PCT/KR2013/000251 claims priority under 35 U.S.C. §365 and/or 35 U.S.C. §119(a) to Korean Patent Application No. 10-2012-0003535 filed Jan. 11, 2012 and which are incorporated herein by reference into the present disclosure as if fully set forth herein.

TECHNICAL FIELD

The present invention relates to an apparatus and method for establishing a connection to a Packet Data Network (PDN) in a mobile communication system.

BACKGROUND ART

In the mobile communication system, the terminal establishes a PDN connection appropriate for the purpose of the packet data to be communicated and establishes bearers in the PDN connection to transmit packets. For example, In order to use the Internet Protocol Multimedia Subsystem (IMS) service for receiving the service provided by an operator, it is necessary to establish a connection to the PDN having the IMS servers. Also, in order to use a certain enterprise network for a service, it is necessary to establish a connection to the PDN having the servers capable of establishing Virtual Private Network (VPN) connection to the enterprise network. In order to establish a connection to a PDN appropriate for the purpose, it is possible to use Access Point Name (APN) as a packet data network identifier.

In the current Evolved Packet System (EPS), the terminal establishes a connection to one PDN as default and has to establish a default bearer in the PDN connection during the Attach procedure for registration with the network.

However, a problem may occur when the default PDN specified in the subscriber information is the PDN which cannot establish connection to the destinations of the general applications running on the terminal. In this case, an extra PDN connection has to be established. A representative example is the subscription for use of Voice over LTE (VoLTE). The default PDN connection corresponds to the IMS APN for use of IMS and the extra PDN connection corresponds to the APN indicated in the subscription information for data communication of the normal applications. If the subscriber uses a terminal having no IMS function, the terminal establishes the default PDN connection to the IMS APN although the subscriber has the subscription information capable of allowing both the IMS and normal data communications. Accordingly, unless the subscriber designates an AP explicitly to establish a PDN connection or unless the APN is not designated explicitly in the profile of the application, the PDN connection is always established with the IMS APN. Since the packet data connection established in this case is capable of allowing processing the normal application data, the normal application data are not routed to the destination successfully but dropped, resulting in failure of data communication.

DISCLOSURE OF INVENTION

Technical Problem

The present invention has been conceived to solve the above problem and aims to provide a PDN connection apparatus and method capable of establishing a suitable PDN connection automatically.

Also, the present invention aims to provide an apparatus and method capable of changing APN during the attach procedure or establishing a PDN connection with the extra APN together with the default APN depending on the functionality of the terminal used by the user having the subscription with the IMS APN as default ANP.

Solution to Problem

In accordance with an aspect of the present invention, a packet data network connection establishment method of a Mobility Management Entity (MME) includes receiving an IP Multimedia Subsystem (IMS) capability indicator from a User Equipment (UE), extracting a default Access Point Name (APN) for use in establishing a default Packet Data Network (PDN) of the UE, and establishing, when the IMS capability indicator indicates that the UE does not support the IMS and the default APN is the APN of an IMS, a connection to the APN indicated by the IMS capability indicator.

In accordance with another aspect of the present invention, a Mobility Management Entity (MME) for establishing a packet data network connection includes a communication unit which receives an IP Multimedia Subsystem (IMS) capability indicator from a User Equipment (UE) and a control unit which extracts a default Access Point Name (APN) for use in establishing default Packet Data Network (PDN) connection, wherein the control unit establishes, when the IMS capability indicator indicates that the UE does not support the IMS and the default APN is the APN of an IMS, a connection to the APN indicated by the IMS capability indicator. Preferably, the control unit establishes, when the IMS capability indicator indicates that the UE does not support the IMS and the default APN is the APN of the IMS, a connection to the APN corresponding to the IMS capability indicator.

Advantageous Effects of Invention

The PDN connection method and apparatus of the present invention is advantageous in terms of establishing suitable PDN connection automatically.

Also, the PDN connection method and apparatus of the present invention is advantageous in that the user having the subscription capable of using both the data communication and VoLTE can receive data communication service using a terminal having no VoLTE capability through a registration procedure.

BRIEF DESCRIPTION OF DRAWINGS

FIG. 2 is a signal flow diagram illustrating a default PDN connection establishment procedure of the EPS according to the second embodiment of the present invention.

FIG. 3 is a signal flow diagram illustrating a default PDN connection establishment procedure according to the third embodiment of the present invention.

FIG. 4 is a signal flow diagram illustrating a default PDN connection establishment procedure of the EPS according to the fourth embodiment of the present invention.

MODE FOR THE INVENTION

Figure 1:
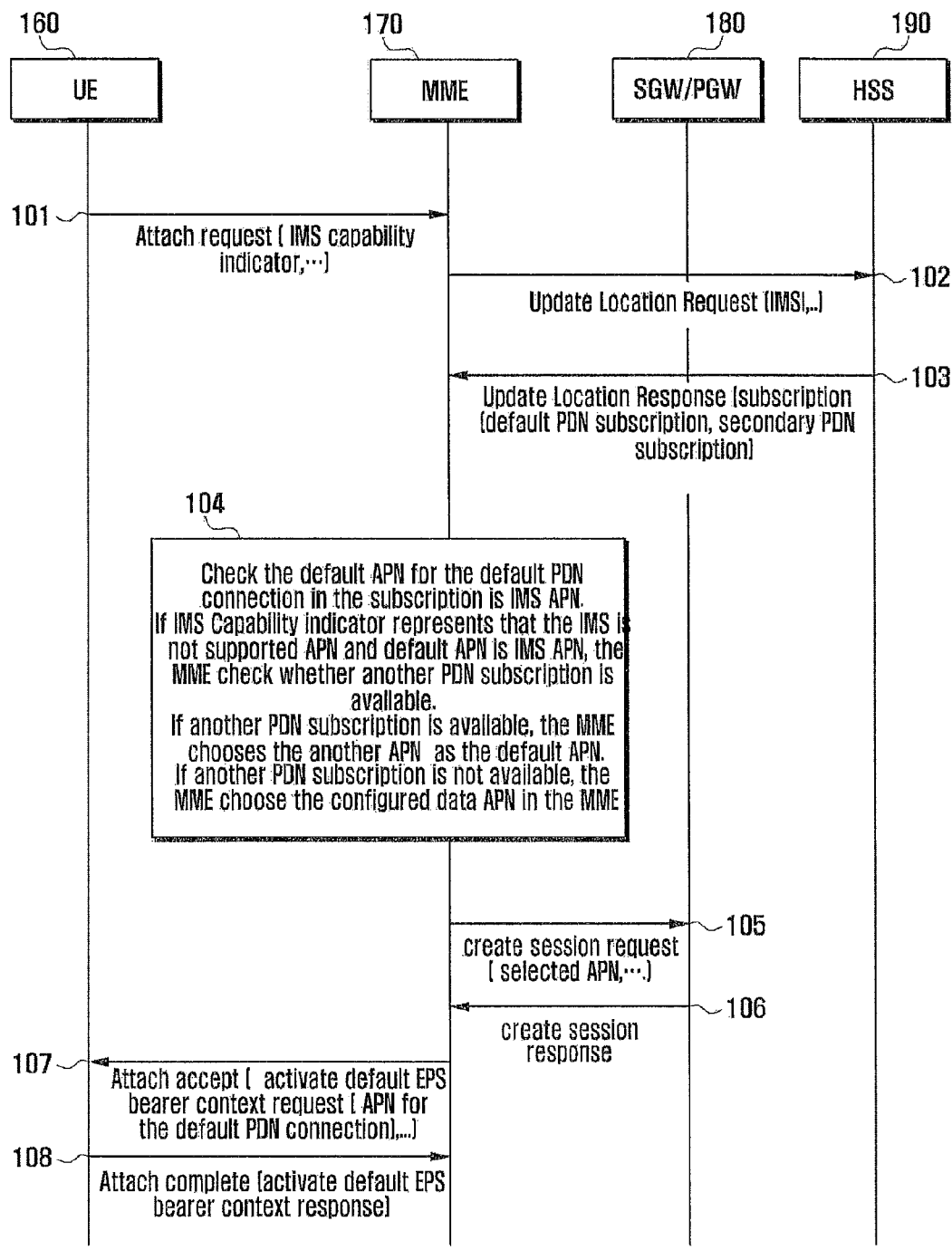
FIG. 1 is a signal flow diagram illustrating a default PDN connection establishment procedure in an EPS according to the first embodiment of the present invention.

Exemplary embodiments of the present invention are described with reference to the accompanying drawings in detail. Detailed description of well-known functions and structures incorporated herein may be omitted to avoid obscuring the subject matter of the present invention.

It is obvious for the apparatus and method of the present invention to be applicable to other mobile communication systems such as Long Term Evolution (LTE) mobile communication system and Institute of Electrical and Electronics Engineers (IEEE) 802.16m communication systems as well as EPS.

FIG. 1 is a signal flow diagram illustrating a default PDN connection establishment procedure in an EPS according to the first embodiment of the present invention.

A User Equipment (UE) 160 sends a Mobility Management Entity (MME) 170 an Attach Request message for registration with the network at step 101. The Attach Request includes an IMS capability indicator indicating IMS capability.

The MME 170 sends a Home Subscriber Server (HSS) 101 an Update Location Request message at step 102. The Update Location Request message may include an International Mobile Subscriber Identity (IMSI) of the UE 160. The HSS 103 sends the MME 170 an Update Location Response message in response to the Updated Location Request message at step 103. The Update Location Response includes subscription data of the UE 160. The subscription data of the UE 160 includes an APN for default PDN subscription. The subscription data of the UE may further include an APN for secondary PDN subscription.

The MME 170 checks the APN for default PDN connection in the subscription data at step 104. If it is determined that the default APN is the IMS APN although the IMS capability indicator indicates that the IMS is not supported, the UE 160 determines whether the subscription data include any other APN. If the subscription data of the UE 160 includes any other APN which is configured for secondary connection, the MME 170 selects the corresponding APN. If the subscription data of the UE 160 includes any other APN but none of them are configured for secondary connection, the MME 170 selects one of the other APNs. If the subscription data of the UE 160 has no other APN but the IMS APN, the MME 170 selects the APN reserved in it. In this case, the MME 170 may reserve the same APN for all UEs. According to an alternative embodiment, the MME may reserve the APN per PLMN. In this case, the MME may check the Public Land Mobile Network (PLMN) based on the IMSI of the UE and uses the APN reserved for PLMN.

The MME 170 selects an SGW/PGW 180 for establishing the PDN connection to the selected APN and sends the SGW/PGW 180 a Create Session Request for PDN connection establishment at step 105. The Create Session Request includes the selected APN. The SGW/PGW 180 sends the MME 170 a Create Session Response in response to the Create Session Request at step 106. Through steps 105 and 106, the default PDN connection is established.

The MME 170 sends the UE 160 an Attach Accept message including the information on the established default PDN connection at step 107. The Attach Accept message includes Activate Default EPS Bearer Context Request with the APN used for the default PDN connection establishment as a parameter. Upon receipt of the Attach Accept message, the UE 160 sends the MME 170 an Attach Complete message including information on the PDN connection and bearer(s) belonging to the PDN connection at step 108. The Attach Complete message includes Activate Default EPS Bearer Response. The Activate Default EPS Bearer Response includes the bearer establishment information.

FIG. 2 is a signal flow diagram illustrating a default PDN connection establishment procedure of the EPS according to the second embodiment of the present invention.

The UE 160 sends the MME 170 an Attach Request for registration with the network at step 201. The Attach Request includes an IMS capability indicator indicating IMS capability. Since steps 202 and 203 are identical with steps 102 and 203 of FIG. 1, detailed descriptions thereon are omitted herein.

The MME 170 checks the APN for default PDN connection which is specified in the subscription data of the UE 160 at step 204. As the check result, if the IMS capability indicator indicates that the IMS is not supported but if the default APN is the IMS APN, the MME 170 checks whether the subscription data of the UE 160 includes any other APN. If the subscription data include any other APN which is configured as a secondary APN, the MME 170 establishes a PDN connection using the designated default APN at step 205 and establishes another PDN connection using the secondary APN additionally at step 206. Since the detailed PDN connection establishment process is identical with steps 105 and 106 of FIG. 1, detailed description thereon is omitted herein. If there is no other APN but the IMS APN, the MME 170 selects a predetermined reserved APN. In this case, the MME 170 may reserve the same APN for all UEs. According to an alternative embodiment, the MME may reserve the APN per PLMN. In this case, the MME 170 may check the PLMN based on the IMSI of the UE and uses the reserved APN corresponding to the PLMN.

The MME 170 sends the UE 160 an Attach Accept message at step 207. The Attach Accept message includes an indicator indicating that two PDN connections are to be established, a Create Default PDN Connection command, and a Secondary Connection Request command.

The UE 160 establishes two PDN connections and bearers belonging to the PDN connections and sends the MME 170 an Attach Complete message notifying thereof at step 208. The Attach Complete message includes Default Bearer Context Activation Responses corresponding two PDN connections generated along with the two-PDN connection indicator.

FIG. 3 is a signal flow diagram illustrating a default PDN connection establishment procedure according to the third embodiment of the present invention.

The UE 160 sends the MME 170 an Attach Request for registration with the network at step 301. The Attach Request includes an IMS capability indicator indicating IMS capability. Since the process of steps 302 and 303 are identical with steps 102 and 103 of FIG. 1, detailed description thereon is omitted herein.

The MME 170 checks the APN configured for default PDN connection in the subscription data of the UE 160 at step 304. As a check result, if the IMS capability indicator indicates that the IMS is not supported but if the default APN is the IMS APN, the MME 170 checks whether the subscription data of the UE 160 includes any other APN. If the subscription data include any other APN which is configured as a secondary APN, the MME 170 establishes a PDN connection using the designated default APN at step 305 and establishes another PDN connection using the secondary APN additionally at step 306. Since the detailed PDN connection establishment process is identical with steps 105 and 106 of FIG. 1, detailed description thereon is omitted herein. If there is no other APN but the IMS APN, the MME 170 selects a predetermined reserved APN. In this case, the MME 170 may reserve the same APN for all UEs. According to an alternative embodiment, the MME may reserve the APN per PLMN. In this case, the MME 170 may check the PLMN based on the IMSI of the UE and uses the reserved APN corresponding to the PLMN.

The MME 170 sends the UE 160 an Attach Accept message including a default PDN Connection establishment command at step 307. Upon receipt of the default PDN connection establishment command, the UE 160 sends the MME 170 an Attach Complete message at step 308. The Attach Complete message may include a Default Bearer Context Activation Response message.

Next, the MME 170 sends the UE 160 an Activate Default EPS Bearer Request message including the secondary APN for secondary PDN connection establishment through a Downlink NAS Transport message at step 309. The UE 160 sends the MME 170 an Activate Default EPS Bearer Response message in response to the Activate Default EPS Bearer Request message including an Uplink NAS Transport command.

FIG. 4 is a signal flow diagram illustrating a default PDN connection establishment procedure of the EPS according to the fourth embodiment of the present invention.

The UE 160 sends the MME 170 an Attach Request for registration with the network at step 401. The Attach Request includes an IMS capability indicator indicating IMS capability. Since the process of steps 402 and 403 are identical with steps 102 and 103 of FIG. 1, detailed description thereon is omitted herein.

The MME 170 checks the APN for default PDN connection in the subscription data of the UE 160 at step 404. As a check result, if the IMS capability indicator indicates that the IMS is not supported but if the default APN is the IMS APN, the MME 170 sends the UE 160 a request indicating that non-IMS APN requirement indicator at step 405. At step 405, the request may be extended to a Ciphered Option request or a new message. Upon receipt of the request, the UE 160 sends the MME 170 a Ciphered Option Response including the APN for data transmission other than the IMS APN at step 406. If a non-IMS APN is received, the MME 170 selects the APN as default PDN connection APN and establishes a PDN connection using the default APN at step 407. The SGW/PGW 180 sends the MME 170 a Create Session Response at step 408.

The MME 170 sends the UE 160 an Attach Accept message including the Default PDN Connection Establishment Request message for establishing a default PDN connection at step 409. Upon receipt of this message, the UE 160 establishes the bearers belonging to the default PDN connection and sends the MME 170 an Attach Complete command including the default EPS Bearer Context Activation response in response to the default PDN Connection Establishment Request at step 410.

The MME 170 may include a communication unit and a control unit. Here, the communication unit may transmit and receive data/signal necessary in one of the embodiments of FIGS. 1 to 4. The control unit controls the MME 170 in order for the UE to perform communication through the gateway 180 based on the IMS capability indicator and whether the default APN supports IMS as described in one of the embodiments of FIGS. 1 to 4.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the present disclosure and is not intended to be limiting. Because modifications of the disclosed various embodiments incorporating the spirit and substance of the present disclosure may occur to persons skilled in the art, the present disclosure should be construed to include everything within the scope of the appended claims and equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a packet data network connection establishment by a mobility management entity (MME), the method comprising:
receiving an internet protocol multimedia subsystem (IMS) capability indicator from a user equipment (UE);
identifying a default access point name (APN) based on subscription information for the UE for use in establishing a default packet data network (PDN) of the UE, the subscription information being received from a home subscription server (HSS) and includes an APN for default PDN subscription and an APN for secondary PDN subscription;
transmitting, to the UE an indicator notifying of a need of another APN that does not support an IMS, when the IMS capability indicator indicates that the UE does not support the IMS and the default APN supports the IMS; and
establishing, a connection to the other APN, wherein the other APN is the APN for the secondary PDN subscription and is included in the subscription information.

2. The method of claim 1, wherein establishing the connection to the other APN further comprises:
identifying, when the IMS capability indicator indicates that the UE does not support the IMS and the default APN supports the IMS, the other APN for use in establishing a PDN connection of the UE; and
establishing, when the other APN does not support the IMS, the connection to the other APN.

3. The method of claim 1, wherein establishing the connection to the other APN further comprises:
establishing a connection to the default APN;
identifying, when the IMS capability indicator of the UE indicates that the UE does not support the IMS and the default APN supports the IMS, the other APN for use in establishing a PDN connection of the UE; and
establishing, when the other APN does not support the IMS, the connection to the other APN.

4. The method of claim 3, further comprising:
transmitting, to the UE, an attach accept message including a PDN connection command for the default APN and a PDN connection command for the other APN.

5. The method of claim 3, further comprising:
transmitting, to the UE, an attach accept message including a PDN connection command for the default APN; and
transmitting, to the UE, the PDN connection command for the other APN through a downlink non access stratum (NAS) transport.

6. The method of claim 1, wherein establishing the connection to the other APN further comprises:
receiving the other APN that does not support the IMS according to the indicator indicating of the need of the other APN that does not support the IMS; and
establishing the connection to the other APN that does not support the IMS.

7. A mobility management entity (MME) for establishing a packet data network connection, the MME comprising:
a transceiver configured to receive an internet protocol multimedia subsystem (IMS) capability indicator from a user equipment (UE); and
a controller configured to:
identify a default access point name (APN) based on subscription information for UE for use in establishing default packet data network (PDN) connection, the subscription information being received from a home subscription server (HSS) and includes an APN for default PDN subscription and an APN for secondary PDN subscription,
transmit, to the UE, an indicator notifying of a need of another APN that does not support an IMS, when the IMS capability indicator indicates that the UE does not support the IMS and the default APN supports the IMS; and
establish a connection to the other APN, wherein the other APN is the APN for the secondary PDN subscription and is included in the subscription information.

8. The MME of claim 7, wherein the controller is further configured to:
identify, when the IMS capability indicator indicates that the UE does not support the IMS and the default APN supports the IMS, the other APN for use in establishing a PDN connection of the UE; and
establish, when the other APN does not support the IMS, the connection to the other APN.

9. The MME of claim 7, wherein the controller is further configured to:
establish the connection to the default APN;
identify, when the IMS capability indicator of the UE indicates that the UE does not support the IMS and the default APN supports the IMS, the other APN for use in establishing a PDN connection of the UE; and
establish, when the other APN does not support the IMS, the connection to the other APN.

10. The MME of claim 9, wherein the controller is further configured to transmit, to the UE, an attach accept message including a PDN connection command for the default APN and a PDN connection command for the other APN.

11. The MME of claim 9, wherein the controller is further configured to:
transmit, to the UE, an attach accept message including a PDN connection command for the default APN; and
transmit, to the UE, the PDN connection command for the other APN through a downlink non access stratum (NAS) transport.

12. The MME of claim 7, wherein the transceiver is further configured to:
receive the other APN that does not support the IMS according to the indicator indicating of a need of the other APN that does not support the IMS; and
establish the connection to the other APN that does not support the IMS.

* * * * *